Oct. 12, 1943.    C. K. ALLEN ET AL    2,331,285
LEVELING MECHANISM
Filed March 27, 1940    2 Sheets-Sheet 2
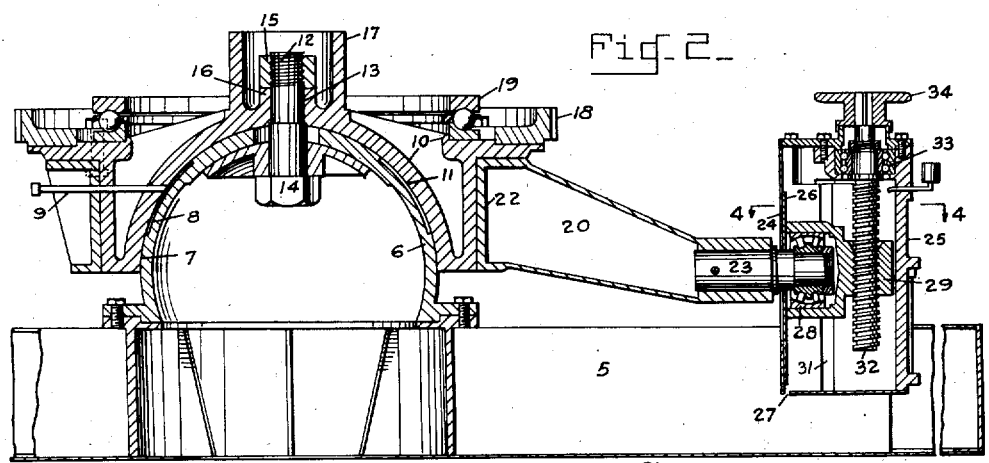
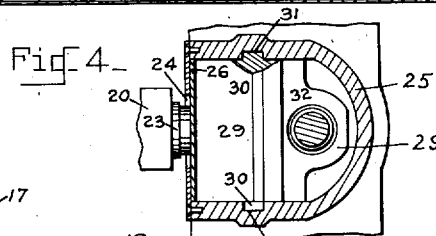
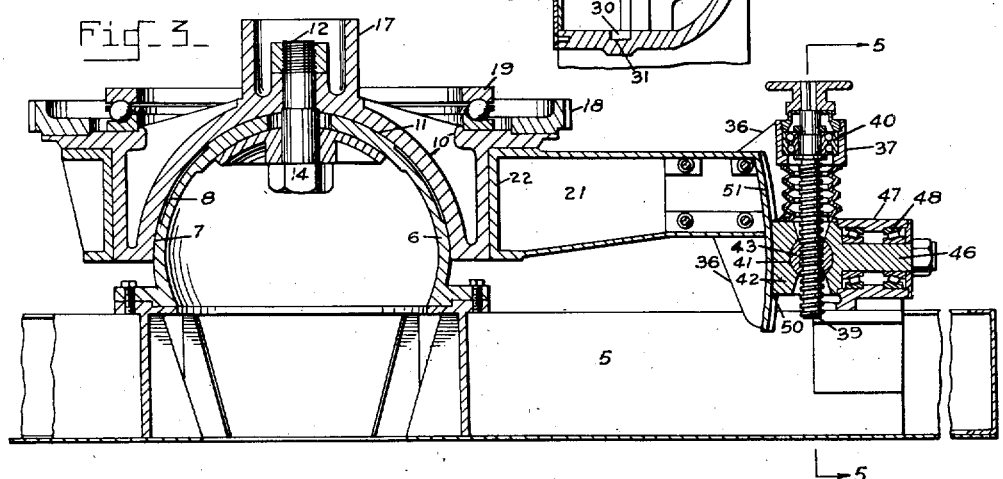
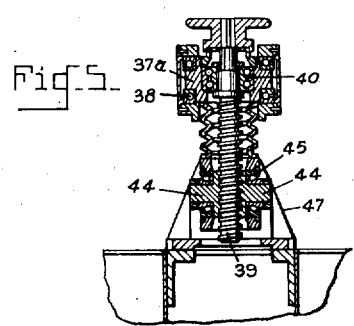
Inventors
Charles K. Allen
Maurice F. Healy
By Kessenich & Church
Attorneys Patented Oct. 12, 1943

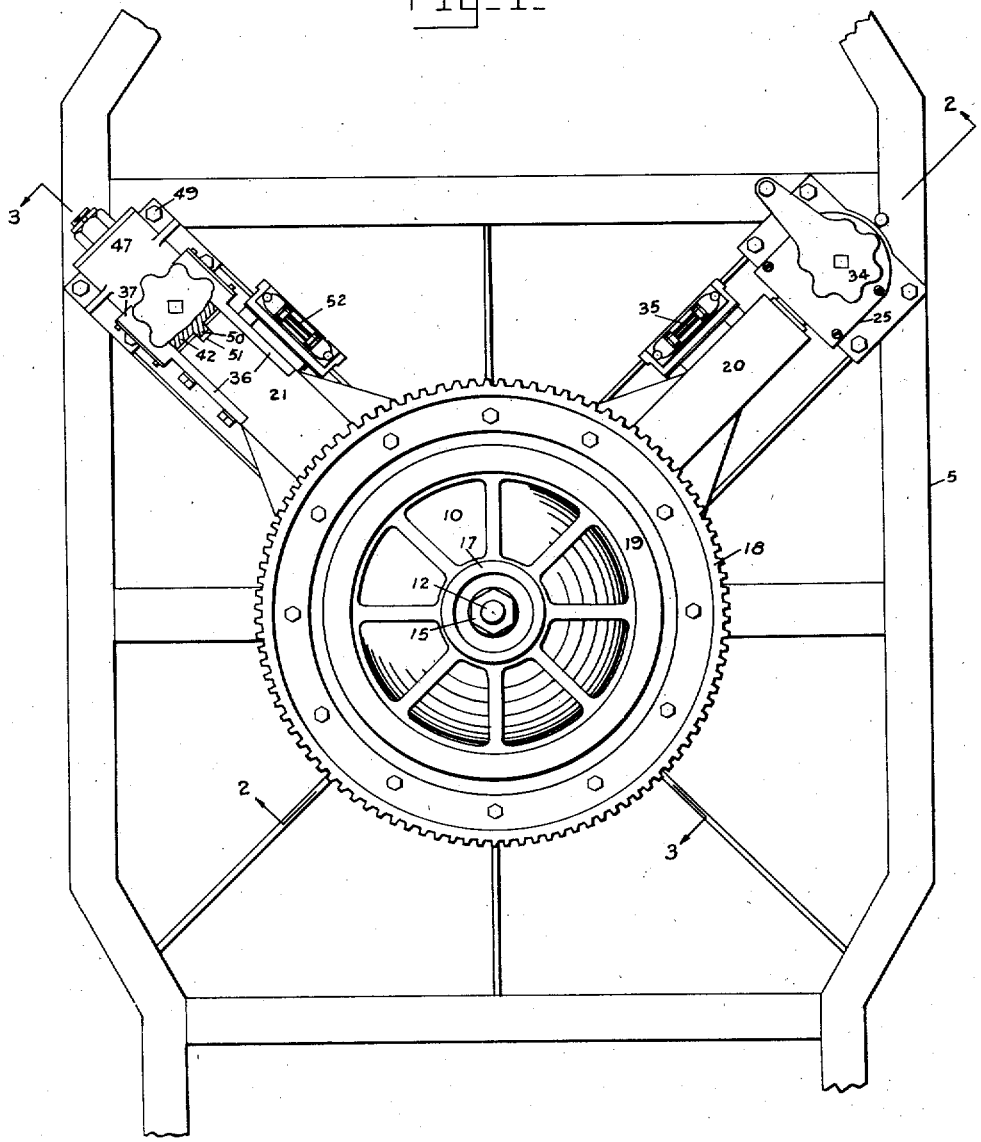

2,331,285

UNITED STATES PATENT OFFICE 2,331,285

LEVELING MECHANISM

Charles K. Allen, United States Army, Fort Devens, and Maurice F. Healy, Watertown, Mass.

Application March 27, 1940, Serial No. 326,207

3 Claims. (Cl. 89—37)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a leveling mechanism which is particularly applicable to a gun mount that is subjected to stresses on firing.

The purpose of the invention is to provide a simple and efficient leveling mechanism for a gun mount whereby the gun trunnions may be maintained at all times in a true horizontal position regardless of the inclination of the gun platform due to the configuration of the ground.

The specific nature of the invention as well as other objects and advantages thereof will clearly appear from a description of a preferred embodiment as shown in the accompanying drawings in which:

Fig. 1 is a plan view with parts in section of the improved leveling mechanism;

Figs. 2 and 3 are sectional views on the corresponding lines of Fig. 1;

Fig. 4 is a sectional view on the line 4—4 of Fig. 2;

Fig. 5 is a sectional view on the line 5—5 of Fig. 3.

Referring to the drawings by characters of reference there is shown at platform 5 on which is secured a bearing 6 having a hemispherical upper and outer surface 7 provided with one or more recesses 8 for receiving a lubricant through a fitting 9. A socket member 10 having a spherical under surface 11 resting on the spherical surface of the bearing is held thereon by means of a bolt 12 which passes through an opening 13 in the bearing. The head 14 of the bolt is preferably at the lower end and retains a spherical shaped washer against the inner surface of the bearing while a nut 15 threaded on the upper end of the bolt bears on a boss 16 within a tubular spindle 17 on the socket member. The socket member is provided with a ring gear 18 forming an element of traversing mechanism for a load such as a gun carriage which rests on an anti-friction bearing 19 and is centered on the spindle which transmits the horizontal reaction of the load, as on firing a gun.

The socket member can be rotated in either of two planes, perpendicular to each other, by means of a pair of arms 20 and 21 spaced ninety degrees apart and having their inner ends fixed to the socket member as by a ring 22. The outer end of the arm 20 (Fig. 2) carries a stud 23 which extends through a slot 24 in a housing 25 fixed to the platform. The slot is closed by a shutter 26 which is apertured to receive the stud and is carried by the nut 29. The shutter is disposed within the housing, moving through an opening 27 during lowering movement.

The extremity of the stud is journaled in a self-aligning bearing 28 which is mounted in a chamber in the side of the nut 29. The nut 29 maintains the shutter in engagement with the wall of the housing and it is provided on opposite sides with ribs 30—30 which ride in grooves 31—31 in the housing. A screw 32 mounted in a bearing 33 in the upper part of the housing threadedly engages the nut and is provided with an operating member 34. A spirit level 35 is carried by the arm.

The outer end of the arm 21 (Figs. 3 and 5) is provided with a bracket 36 in which a support 37 is mounted through trunnions 37a in anti-friction bearings 38, the trunnions being normal to arm 21. A screw 39 mounted in the support by means of an anti-friction bearing 40 has its lower portion threaded in a nut 41 which is mounted in a block 42 by means of a cylindrical central portion 43 and axial trunnions 44, the latter being parallel to the trunnions 37a and mounted in anti-friction bearings 45. The block has a single trunnion 46 which is in a horizontal plane containing the center of bearing 6 and the axis of stud 23, which is perpendicular to a plane containing the axis of screw 32, and which is in prolongation of the axis of rotation of arm 21. The trunnion is swiveled in a housing 47 by means of anti-friction bearings 48. The housing 47 is secured to the platform by means of bolts 49.

The block 42 is formed with an integral key 50 which rides in an arcuate keyway 51 in the outer end of the arm 21. This arrangement serves to prevent horizontal displacement of the arm 21 and eliminates all but axial stresses on the screw 39. The arm 21 is provided with a longitudinally extending spirit level 52.

In operation, when the arm 20 is elevated or lowered through actuation of the screw 32 the socket member 10 carrying the load is tilted with respect to bearing 6. The nut 29 is restricted to vertical displacement and the self-aligning bearing 28 accommodates the inclination of the stud 23. The bearing 6, in tilting, rocks about the trunnion 46. The screw 39 carried by the arm 21 will now be in an inclined position.

If the screw 39 is now actuated to elevate or lower the arm 21 the bearing 6 is tilted and rocks about the stud 23. The vertical displacement of the screw 39 carried by the arm 21 results in its inclination with respect to the block 42 and accommodation for this inclination is provided for by the trunnioned support 37 and the trunnioned nut 41.

We claim:

1. In a mechanism of the character described, a support, a spherical bearing fixed to the support, a correspondingly internally shaped socket member mounted on said bearing for supporting a gun, a radially extending arm secured to said member, a housing secured to the support, a nut slidably supported in the housing, a self-aligning bearing in said nut, a stud carried by said arm and journalled in the self-aligning bearing, a screw cooperating with the nut to raise or lower the arm, a second radially extending arm secured to said socket member and perpendicularly related to the first mentioned arm, a housing on the support at the end of the second arm, a block swivelled in said last mentioned housing, a screw trunnioned in said second arm, and a nut trunnioned in the block and engaged by said screw.

2. In a mechanism of the character described, a support, a spherical bearing fixed to the support, a correspondingly internally shaped socket member mounted on said bearing member for supporting a gun, a radially extending arm secured to said socket member, a housing secured to the support, a nut slidably supported in the housing, a self-aligning bearing in said nut, a stud carried by said arm and journalled in said self-aligning bearing, means carried by the support for reciprocating the nut, a second radially extending arm perpendicularly related to the first arm, a housing carried by the support, a block swivelled in said last mentioned housing, an arcuate bracket carried by the second arm and having sliding and guiding engagement with the block, a screw trunnioned on the second arm and a nut trunnioned in the block and engaged by the screw for raising or lowering the second arm.

3. In a mechanism of the character described, a support, a spherical bearing fixed to the support, a correspondingly internally shaped socket member mounted on the support for supporting a gun, a pair of perpendicularly related arms secured to the socket member, one of which has an arcuate end, a housing on the support, a vertically movable nut mounted and guided in the housing, a self-aligning bearing in said nut, a trunnion on one arm journalled in said bearing, and means for reciprocating the nut to raise or lower the trunnion carrying arm, a housing on the support at the end of the other arm, a block swivelled in said last mentioned housing, groove and tongue connections between said block and the arcuate end of the said other arm, a bracket on said other arm, a screw trunnioned on the bracket and a nut trunnioned in the block and engaged by the screw to move the socket member on the spherical bearing.

CHARLES K. ALLEN.
MAURICE F. HEALY.